Patented Apr. 10, 1934

1,954,622

UNITED STATES PATENT OFFICE 1,954,622

TREATMENT OF TEXTILE MATERIALS

George Holland Ellis and William Bertram Miller, Spondon, near Derby, England, assignors to Celanese Corporation of America, a corporation of Delaware No Drawing. Application August 30, 1930, Serial No. 479,087. In Great Britain October 26, 1929

9 Claims. (Cl. 8—5)

This invention relates to the production of white or coloured pattern effects on materials made of or containing cellulose acetate or other cellulose esters or ethers.

Hitherto very considerable difficulties have been experienced in the production of discharge effects on cellulose ester or ether materials. Discharges have been obtained by the application of formaldehyde sulphoxylates on cellulose acetate materials but only under exceptional conditions. The severe conditions which have been found necessary in producing discharge effects by the aforementioned process are undesirable in many cases, particularly when it is required to produce coloured discharge effects by incorporating suitable colouring matters in the discharge preparation. For example it is found that many of the colouring matters, e. g. basic colouring matters commonly employed for the colouration of formaldehyde sulphoxylate discharges are destroyed under the severe conditions necessary for the effective discharge of ground colours, whether the latter are applied to the materials before or after the discharge preparations.

We have now found that, in the presence of compounds containing the thiocyanate radicle, highly satisfactory discharge effects may be obtained on materials made of or containing cellulose acetate or other organic substitution derivatives of cellulose by means of stannous compounds, titanous compounds, or other metal compounds serving as reducing agents and convertible by oxidation into substances in which the metal is in a higher state of oxidation, said metal compounds being hereinafter referred to as compounds of reducing metals. The new process is particularly advantageous when it is desired to produce coloured discharges, for we have further found that the discharges admit of satisfactory colouration by means of any one or more of a large number of colouring matters, for example many basic colouring matters of the di- and triaryl-methane, azine, oxazine and thiazine series.

By the new method it has been found possible to obtain very complete discharge effects even on many very deep shades, for example blacks, navy blues and deep browns, while at the same time, as indicated above, it is possible to colour the said discharge effects by means of many basic colouring matters. As the latter include very many of the brightest colouring matters available for colouring cellulose ester and ether materials, the invention renders possible the easy production of brightly coloured discharge effects on dark grounds on cellulose ester and ether materials.

The invention may be carried into effect in various ways, for example a fabric made of cellulose ester yarns may be coloured either uniformly or locally with a suitable colouring matter and printed or otherwise locally treated with a stannous compound, or other reducing metal compounds as hereinbefore defined, applied in the presence of a thiocyanate. According to a further method an uncoloured fabric may be locally treated with a preparation containing the reducing metal compound and a thiocyanate, and be subsequently treated with a suitable dischargeable colouring matter. In either case the discharge preparation may contain colouring matters which resist its action and which have affinity for or are capable of being fixed on the cellulose ester fabric, whereby coloured discharge effects may readily be obtained.

Any suitable stannous compounds, or other reducing metal compounds as hereinbefore defined, may be used in the production of discharge effects in accordance with the invention, for example stannous salts e. g. stannous chloride or titanous salts e. g. titanous chloride. As compounds containing the thiocyanate radicle may be mentioned ammonium thiocyanate and alkali or alkaline earth thiocyanates, for example sodium, potassium, calcium, or barium thiocyanate. The thiocyanates are preferably applied to the materials in admixture with the stannous compounds or other reducing metal compounds; for example a discharge preparation may comprise a stannous salt e. g. stannous chloride, and a soluble thiocyanate e. g. potassium thiocyanate. Such preparations may be regarded as containing stannous thiocyanate or other reducing metal thiocyanate, or stannous chloro-thiocyanate or other double salts containing both the thiocyanate radicle and other acid radicles. The invention contemplates the use of such thiocyanates, or double salts containing the thiocyanate radicle, whether such salts are acid, neutral, or basic, and whether they are produced during the preparation of the discharge preparations, or in a separate operation, or otherwise.

The proportion of the compound containing the thiocyanate radicle to the reducing metal compound may vary within wide limits. Thus, for example, very good results may be obtained by employing the thiocyanate in quantity chemically equivalent to one eighth, one quarter, or one half the reducing metal compound present, but a greater or less proportion of thiocyanate may be employed if desired. In some cases the discharging action may be assisted by the presence of other substances, for example acids, e. g. organic acids such as citric acid or tartaric acid, and/or by the presence of swelling agents for the cellulose ester or ether materials. Acids may be either incorporated in the discharge preparations or applied to the fabrics, prior to the application of the discharge preparations, in the manner described in U. S. application S. No. 439,264 filed 26th March, 1930.

The invention is applicable to the discharge of a very wide range of colourations. For example, it has been found possible to obtain highly satisfactory discharge effects on many shades, even dark shades, produced by means of the azo colouring matters and nitro-diarylamine colouring matters commonly employed in the colouration of cellulose ester materials. Particular mention may be made of the possibility of discharging the black or other dark shades obtainable on cellulose ester materials by applying amino-azo compounds and subsequently diazotizing and developing with β-oxy-naphthoic acid or other suitable coupling components.

As indicated previously, the discharge effects produced in accordance with the invention may be coloured by incorporating in the discharge preparation any suitable colouring matters not destroyed thereby, and having affinity for or capable of being fixed on the cellulose ester or ether materials under treatment. In particular, mention may be made of the basic colouring matters of the di- and tri-aryl-methane, azine, oxazine and thiazine series, many of which yield particularly bright discharge effects of great value when incorporated in the discharge preparations.

The discharge preparations of the present invention may be applied to the materials in any desired manner, for example by printing, stencilling or other mode of local application. In general they will be applied to the cellulose ester or ether materials in admixture with suitable thickening agents selected according to the precise means of application to be adopted. After printing or other local application of the discharge preparation the goods may be aged or steamed as desired or necessary to effect or complete the action of the discharging agent, and/or to effect fixation of any colouring matters simultaneously applied therewith. The goods may finally be washed and if necessary subjected to any further treatment required to effect or complete fixation of colouring matters present in the discharge preparations or may be otherwise finished as desired.

The invention is applicable to the treatment of textile fabrics or other textile materials made of or containing any desired organic substitution derivatives of cellulose. As examples of such derivatives may be mentioned cellulose esters, for example cellulose acetate, formate, propionate or butyrate, or the products obtained by treating alkalized cellulose with esterifying agents (e. g. the products known as immunized cotton obtained by treatment with p-toluene-sulphochloride), and cellulose ethers for example, ethyl, methyl and benzyl cellulose, and the analogous condensation products obtainable from cellulose and glycols or other polyhydric alcohols. Mixed materials containing one or more of the aforementioned cellulose derivatives together with other textile fibres may likewise be treated in accordance with the invention. Such materials may contain, for instance, in addition to a cellulose ester or ether, cotton, wool, silk, or a regenerated cellulose type of artificial silk. Such mixed materials may be coloured in solid or contrasting shades as desired, and the colouration applied to the non-ester or ether portion of the material may be either dischargeable or non-dischargeable according to the effect required.

The invention is illustrated but not limited by the following examples:—

Example 1

A fabric woven from cellulose acetate yarns is dyed by known methods with 2% of its weight of p-amino-benzene-azo-dimethyl-aniline and after rinsing diazotized and coupled in the usual manner with 3% of its weight of β-oxynaphthoic acid. It is dried, prepared for printing as desired or requisite and printed with a paste of the following composition:—

|  | Grams |
|---|---|
| Gum arabic 1:1 | 550 |
| Auramine (Colour Index No. 655) | 40 |
| Water | 175 |
| Stannous chloride crystals | 200 |
| Potassium thiocyanate | 25 |
| Citric acid | 10 |
|  | 1000 |

The printed fabric is dried, steamed or aged as necessary and finally rinsed, soaped lightly and otherwise finished as desired or requisite. A brilliant yellow pattern on a black ground results.

Example 2

A woven fabric composed of cellulose acetate yarns is dyed black as in Example 1 and is printed with a paste composed as follows:—

|  | Grams |
|---|---|
| Methylene blue (Colour Index No. 922) | 40 |
| Water | 180 |
| Gum arabic 1:1 | 500 |
| Stannous chloride | 200 |
| Potassium thiocyanate | 70 |
| Citric acid | 10 |
|  | 1000 |

The material after printing is dried and steamed or aged as necesasry either in the rapid ager or cottage steamer. It is then treated in a bath at 70–80° C. containing 2.5 grams per litre of soap and 1 gram per litre of sodium perborate for 2 to 5 minutes, or until the leuco compound of the Methylene blue is completely oxidized, and finally rinsed, dried or otherwise finished as desired or requisite. A greenish blue design on a black ground results.

Example 3

A woven fabric composed of cellulose acetate yarns is dyed a full shade of red by known dispersion methods with the azo dyestuff from diazotized 5-nitro-2-amino-1-methoxy-benzene and dimethylaniline. The dyed fabric is dried, further prepared for printing as desired, and printed with a paste of the following composition:—

|  | Grams |
|---|---|
| Gum arabic 1:1 | 560 |
| Malachite green (Colour Index No. 657) | 40 |
| Water | 180 |
| Stannous chloride crystals | 200 |
| Potassium thiocyanate | 10 |
| Citric acid | 10 |
|  | 1000 |

After printing the material is dried, steamed or aged as necessary either in the "rapid ager" or in the cottage steamer, rinsed, soaped lightly and otherwise finished as desired or requisite. A brilliant green design on a red ground is thus obtained.

*Example 4*

A fabric woven from cellulose acetate yarns is dyed a full brown shade by known methods with 1.8% of the dyestuff known commercially as Cellit Blue R., 2% of the azo dye from 5-nitro-2-amino-1-methoxy-benzene and dimethylaniline and 9% of 4-chlor-2-nitrodiphenylamine all calculated on the weight of the fabric. After dyeing the fabric is dried, prepared for printing as desired, and printed with a paste constituted as follows:—

| | Grams |
|---|---|
| Methyl violet 2B (Color Index No. 680) | 30 |
| Water | 180 |
| Gum arabic 1:1 | 530 |
| Potassium thiocyanate | 50 |
| Citric acid | 10 |
| Stannous chloride | 200 |
| | 1000 |

The printed material is dried, steamed or aged as necessary, rinsed, soaped lightly and further finished as desired or requisite. A bright violet print on a brown ground is obtained.

What we claim and desire to secure by Letters Patent is:—

1. Process for the production of discharge effects upon textile materials made of or containing organic substitution derivatives of cellulose, comprising effecting discharge of a ground color by means of compounds selected from the group consisting of stannous and titanous compounds in the presence of compounds containing thiocyanate radicles.

2. Process for the production of discharge effects upon textile materials made of or containing organic substitution derivatives of cellulose, comprising the separate operations of applying a dischargeable coloring matter thereto and of applying preparations comprising compounds selected from the group consisting of stannous and titanous compounds and compounds containing thiocyanate radicles, the thiocyanate compound being employed in quantity chemically equivalent to from 1/20 to ½ of the compound of the reducing metal.

3. Process for the production of discharge effects upon textile materials made of or containing organic substitution derivatives of cellulose, comprising the separate operations of applying a dischargeable coloring matter thereto and of applying preparations comprising stannous compounds and compounds containing thiocyanate radicles.

4. Process for the production of discharge effects upon textile materials made of or containing organic substitution derivatives of cellulose, comprising the separate operations of applying a dischargeable coloring matter thereto and of applying preparations comprising stannous compounds and compounds containing thiocyanate radicles, the thiocyanate compound being employed in quantity chemically equivalent to from 1/20 to ½ of the stannous compound.

5. Process for the production of discharge effects upon textile materials made of or containing cellulose acetate, comprising the separate operations of applying a dischargeable coloring matter thereto and of applying preparations comprising compounds selected from the group consisting of stannous and titanous compounds and compounds containing thiocyanate radicles, the thiocyanate compound being employed in quantity chemically equivalent to from 1/20 to ½ of the compound of the reducing metal.

6. Process for the production of discharge effects upon textile materials made of or containing cellulose acetate, comprising the separate operations of applying a dischargeable coloring matter thereto and of applying preparations comprising stannous compounds and compounds containing thiocyanate radicles, the thiocyanate compound being employed in quantity chemically equivalent to from 1/20 to ½ of the stannous compound.

7. Process for the production of discharge effects upon textile materials made of or containing cellulose acetate, comprising the separate operations of applying a dischargeable coloring matter thereto and of applying preparations comprising stannous compounds and alkali metal thiocyanates.

8. Process for the production of discharge effects upon textile materials made of or containing cellulose acetate, comprising the separate operations of applying a dischargeable coloring matter thereto and of applying preparations comprising stannous chloride and compounds containing thiocyanate radicles, the thiocyanate compound being employed in quantity chemically equivalent to from 1/20 to ¼ of the stannous chloride.

9. Process for the production of discharge effects upon textile materials made of or containing cellulose acetate, comprising the separate operations of applying a dischargeable coloring matter thereto and of applying preparations comprising stannous compounds and ammonium thiocyanate, the latter in quantity chemically equivalent to from 1/20 to ¼ of the stannous compounds.

GEORGE HOLLAND ELLIS.
WILLIAM BERTRAM MILLER.